(12) United States Patent
Yee et al.

(10) Patent No.: US 8,218,090 B2
(45) Date of Patent: Jul. 10, 2012

(54) INTEGRATED USER INTERFACE AND CONTROL IN HDMI/CEC

(75) Inventors: Woei-Shyang Yee, San Diego, CA (US); DongWook Kim, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 399 days.

(21) Appl. No.: 12/561,634

(22) Filed: Sep. 17, 2009

(65) Prior Publication Data

US 2011/0063524 A1    Mar. 17, 2011

(51) Int. Cl.
*H04N 5/50* (2006.01)
*H04N 5/44* (2011.01)
*H04N 5/268* (2006.01)

(52) U.S. Cl. .......................... 348/705; 348/553; 348/569

(58) Field of Classification Search .................. 348/552, 348/553, 569, 705, 706, 836, 839; 725/131–133, 725/139–141, 151–153; 386/230, 231; 710/8, 710/11, 15, 18, 19, 62, 73
See application file for complete search history.

(56) References Cited

U.S. PATENT DOCUMENTS

| | | | | |
|---|---|---|---|---|
| 7,554,614 | B2 * | 6/2009 | Satou | 348/734 |
| 2002/0171624 | A1 | 11/2002 | Stecyk et al. | |
| 2002/0171763 | A1 * | 11/2002 | Stecyk et al. | 348/552 |
| 2005/0190303 | A1 * | 9/2005 | Kim et al. | 348/706 |
| 2006/0224781 | A1 | 10/2006 | Tsao et al. | |
| 2007/0156894 | A1 | 7/2007 | Dees | |
| 2009/0015723 | A1 * | 1/2009 | Doumuki | 348/725 |
| 2009/0125642 | A1 * | 5/2009 | Overby et al. | 710/5 |
| 2009/0322855 | A1 * | 12/2009 | Abe | 348/14.12 |
| 2010/0157172 | A1 * | 6/2010 | Chen et al. | 348/738 |

FOREIGN PATENT DOCUMENTS

| | | |
|---|---|---|
| KR | 10-2005-0000030 | 1/2005 |
| KR | 10-2005-0073435 | 7/2005 |
| KR | 10-2009-0019473 | 2/2009 |

\* cited by examiner

*Primary Examiner* — Victor Kostak
(74) *Attorney, Agent, or Firm* — John L. Rogitz

(57) ABSTRACT

A TV in a HDMI home network discovers other components that can source a common UI such as a cross-media bar (XMB). The XMB generated by each component is dynamically changed to include UI source icons representing components in the network discovered to have the capability to source the XMB, so that the user can select the component that is to source the UI and then, regardless of what remote control device in the system is used to enter XMB commands to its particular component, the component receiving the commands forwards the commands via CEC to the component that has been selected to source the XMB, avoiding distracting unintentional overlaying of multiple XMBs on top of each other.

17 Claims, 2 Drawing Sheets

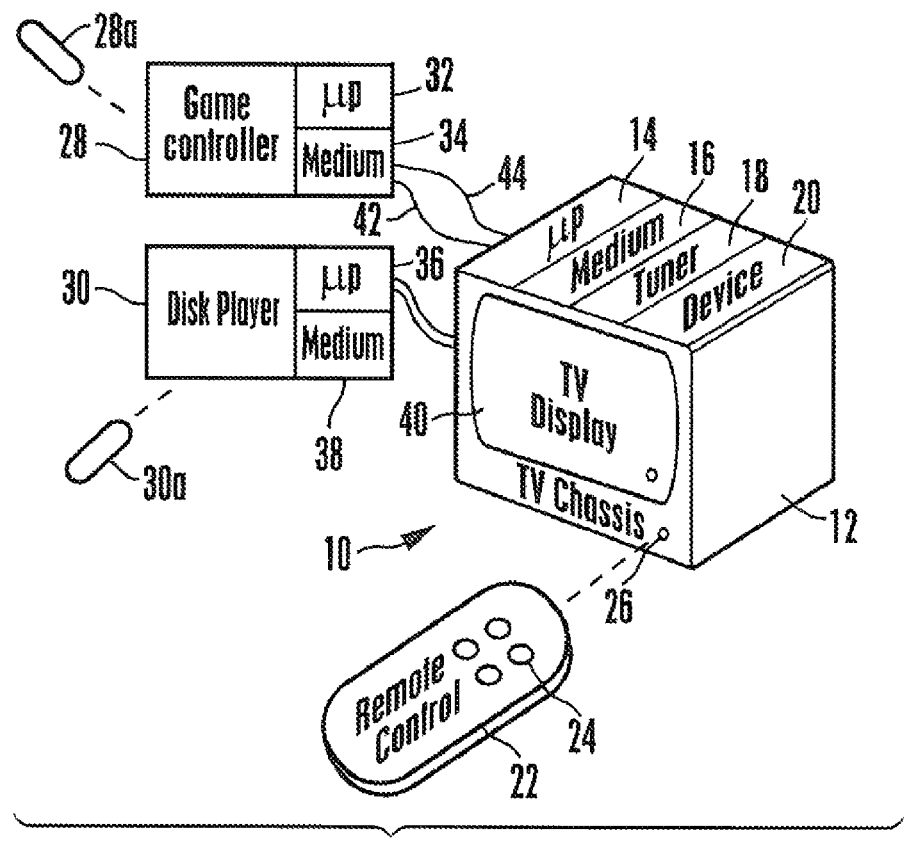
Figure 1
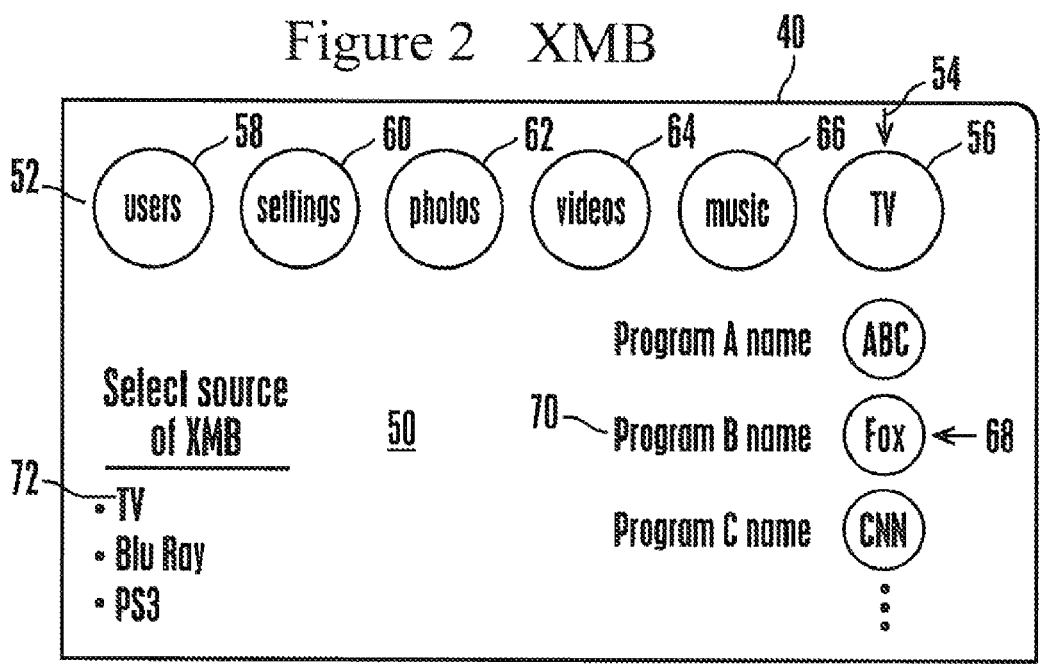
Figure 2 XMB

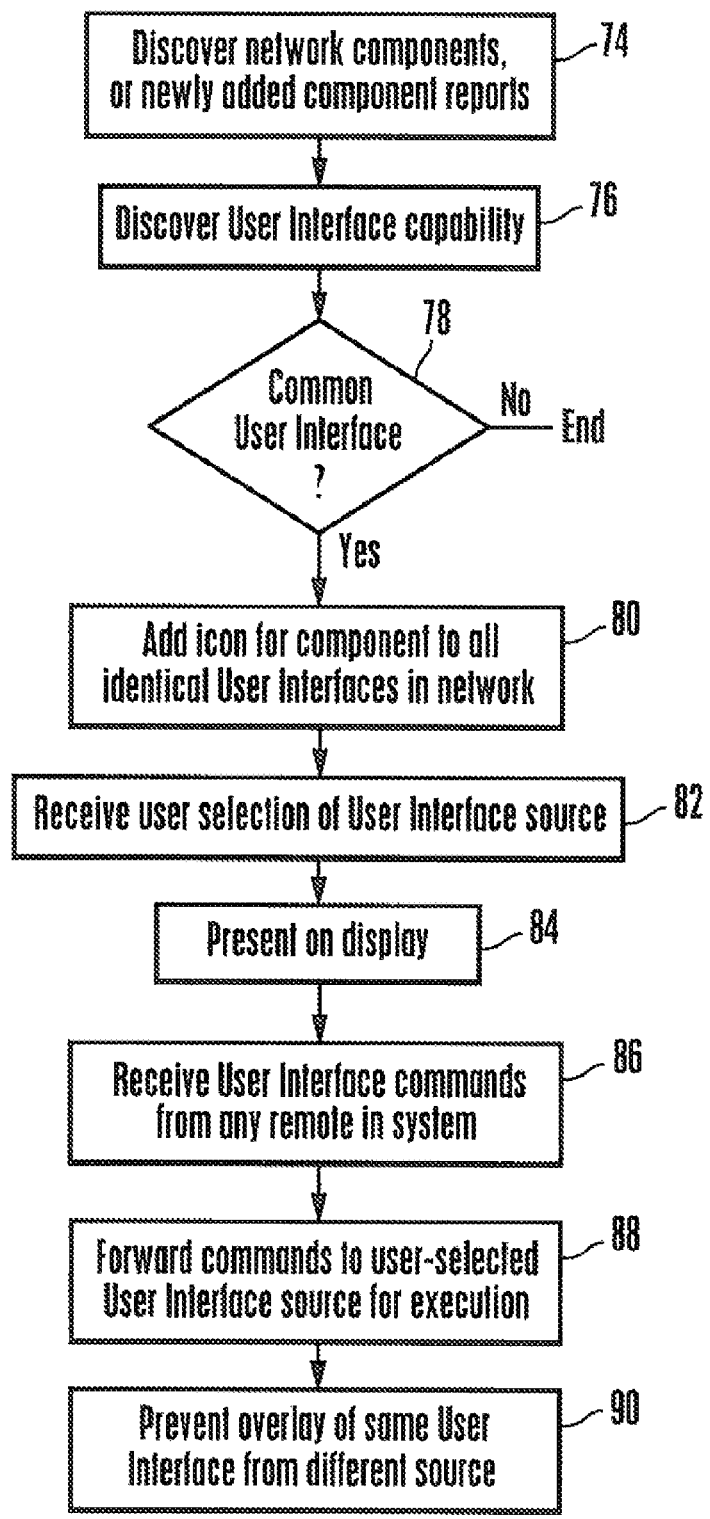

INTEGRATED USER INTERFACE AND CONTROL IN HDMI/CEC

I. FIELD OF THE INVENTION

The present invention relates generally to integrated user interfaces (UI) in a home network having multiple devices each programmed to present a UI similar to other the UI presented by other devices in the network, and in particular using the consumer electronics control (CEC) feature afforded by the high definition multimedia interface (HDMI) protocol.

II. BACKGROUND OF THE INVENTION

TV user interfaces (UI) have been provided that list various features provided by the TV. An example of a successful UI is the present assignee's cross-media bar (XMB), which presents a horizontal row of icons representing various multimedia genre and when one of the genre is selected, a vertical column of available titles in that genus.

As home networks have developed with the TV at the center of the network, other devices such as disk players also are programmed to provide a UI that may be substantially identical to a TV UI. For example, when a TV user selects a disk player as TV input, the disk player may cause its own XMB to be presented on a TV. Unfortunately, as understood herein integration is not seamless. For example, after using the TV remote control to select "disk player" as input, to subsequently operate the disk player UI a disk player remote control that is separate from the TV remote control must be used. Moreover, other activities using other remote controls may cause unintended artifacts. As an example, depressing a "home" key on the TV remote control while the disk player XMB is displayed obtrusively causes the TV-generated XMB to be overlaid on the disk player XMB, which is distracting to the user.

SUMMARY OF THE INVENTION

Accordingly a system includes a video display, a processor controlling video display, and a TV tuner providing TV signals to the processor for presentation on the display. The processor presents a common user interface (UI) on the TV display. The common UI presents UI source icons representing components that can source the common UI, and the common UI presented on the display is generated by a component represented by a selected one of the UI source icons.

Overlay of a UI from a non-selected component capable of generating the UI is prevented when another component is selected to source the UI even if a remote control device associated with the non-selected component is manipulated to generate a command to present the UI from the non-selected source.

The UI may be a cross-media bar (XMB) that also presents genre icons representing respective media genre in a horizontal row. A genre icon is selectable by means of a remote control device to cause a vertical column to be presented under the genre icon. The vertical column includes icons representing content titles.

In example embodiments the processor executes logic that can include discovering components on the system and discovering, for each component, its UI capability. For each component determined to generate the common UI, a corresponding UI source icon is established on the UI. Each component determined to generate the common UI is commanded to establish the UI source icon on the common UI generated by that component. Information exchange to this end may be effected using a consumer electronics control (CEC) link associated with a high definition multimedia (HDMI) link.

Also, if a first UI source icon representing a first component is selected, in response the identity of the first component as being the selected UI source is sent to other components in the system. In this way, a UI command generated by a remote control associated with a second component can be sent by the second component to the first component for execution of the UI command by the first component. Overlays, one on top of the other, of the common UI from various components is prevented.

In another aspect, a system includes a TV associated with a TV remote control and a display. The TV communicates with at least a first component over a HDMI link to receive multimedia data from the first component for display thereof on the TV. The TV also communicates with the first component over a CEC link to exchange at least UI data. The TV presents on the display a UI generated by the first component and while the UI generated by the first component is presented on the display, receives UI commands from the TV remote control. The TV forwards the commands to the first component over the CEC link.

In another aspect, a method includes discovering components in a home network along with their capability to source a common UI. Also, the method includes dynamically changing the UI of each component to include UI source icons representing components in the network discovered to have the capability to source the UI, so that the user can select the component that is to source the UI. Regardless of what remote control device in the system is used to enter UI commands to its particular component, the method includes forwarding from the component receiving the commands the commands via CEC to the component that has been selected to source the UI.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example TV system in accordance with present principles;

FIG. 2 is a screen shot of a cross-media bar (XMB) that can be presented on the TV display; and FIG. 3 is example logic that may be executed in accordance with present principles.

DETAILED DESCRIPTION OF THE PREFERRED EMBODIMENT

Referring initially to FIG. 1, a TV system 10 includes a TV chassis 12 holding a TV processor 14 accessing a computer-readable storage medium 16 such as disk-based or solid state storage. The chassis 12 may also hold a TV tuner 18 communicating TV signals to the TV processor 14. There need be only a single analog/digital TV tuner 18 provided in the TV system 10, it being understood that the single analog/digital TV tuner 18 may be physically implemented by one and only one combined digital/analog tuner or by a single digital tuner or by one and only one digital tuner in combination with one and only one analog tuner. In other embodiments only a single analog tuner and no digital tuners may be provided. The tuner 18 may be provided in the chassis 12 or in a set-top box, and the tuner 18 may receive TV signals from a satellite, cable head end, terrestrial broadcast antenna, etc. If desired, a network interface device 20 such as but not limited to an Internet enabled modem may be provided to send Internet signals to the TV processor 14.

As shown, the TV system 10 also includes a portable hand-holdable TV remote control (RC) 22. The RC 22, among other things, can have cursor control keys 24 for sending wireless signals to a receiver 26 on the chassis 12. The signals detected by the receiver 26 are sent to the TV processor 14.

In some embodiments the TV system 10 may receive video from a game console 28 such as but not limited to a console in the Sony Playstation® family and/or from a digital disk player 30 such as a Blu Ray® disk player. The console 28 typically includes a game processor 32 accessing a game storage medium 34 storing audio and/or video data and likewise the disk player 30 typically includes a disk processor 36 accessing a disk storage medium 38 storing audio and/or video data. The game console can have a game remote control 28a and the disk player can be associated with a wireless disk player remote control 30a.

Content from the TV tuner 18 and, when provided, from the game console 28/disk player 30 may be presented under control of the TV processor 14 on a TV display 40 such as but not limited to a plasma display or flat panel matrix-type display, either standard definition (SD) and/or high definition (HD).

In one example embodiment the components shown in FIG. 1 communicate multimedia data to each other over high definition multimedia interface (HDMI) links 42, and the components also communicate control data over consumer electronics control (CEC) links 44 that typically accompany HDMI links. In the example non-limiting architecture shown in FIG. 1 the TV 12 is the central node of the network but it is to be understood that all components may be linked together directly or only some components may be linked together directly, with communication to other components potentially passing through intervening components. In any case, additional content sources such as but not limited universal serial bus (USB) mass storage, personal video recorders (PVR), digital cameras, set-top boxes, removable memory media, etc. may be used in conjunction with the TV system 10.

In accordance with present principles, multiple components in the home network may each produce substantially the same UI. For example, both the disk player 30 and game console 32 may generate a respective XMB that is substantially identical to the XMB generated by the TV itself. Accordingly, FIG. 2 shows an example UI that may be produced by plural of the components shown in FIG. 1. The example UI in FIG. 2 is a cross-media bar (XMB) UI 50 with the modifications noted below with respect to the dynamic component icons.

The XMB 50 shows various input genres. With greater specificity, the XMB 50, which may be entered by pressing a "XMB" key on the RC 22 or from a setup menu or other menu on the TV, typically includes a row 52 of feature icons. The icons are used to represent categories to organize the content options available to the user. An icon in the row 52 may be activated by moving a screen cursor over the icon, in some cases accompanied by manipulating a "select" key on the RC 22. When an icon such as a TV icon 56 is made active, several more icons appear vertically beneath (and in some cases above) the selected icon 56 in a vertical column as shown, with the icons in the column representing instances of the selected genre, in this case, TV channels.

By way of non-limiting example, the XMB 50 shown in FIG. 3 may include a "users" icon 58, selection of which causes a column of user profiles to be presented above and/or below the users icon 58. The XMB 50 may also include a settings icon 60, selection of which may cause a column of setting options such as language selection, etc. to be presented above and/or below the icon 60. Likewise, a "photos" icon 62 may be presented in the row 52, selection of which causes icons representing photos available on, e.g., any one or more of the storage media 16, 34, 38 to appear in a column on the icon 62.

Similarly, a "videos" icon 64 may be presented in the row 52, selection of which causes icons representing videos available on, e.g., any one or more of the storage media 16, 34, 38 to appear in a column on the icon 64. Also, a "music" icon 66 may be presented in the row 52, selection of which causes icons representing audio files available on, e.g., any one or more of the storage media 16, 34, 38 to appear in a column on the icon 66. In all of the above cases, a user can select an icon in a column to cause the associated audio track/video/photo/etc. to be presented on the TV system 10. When the TV icon is highlighted a vertical column of available TV channel names 68 with corresponding current program titles 70 is presented on the display.

Additionally, recognizing that the TV, disk player, and game console can all cause a XMB to be generated, to avoid the above-noted problems with overlaying one XMB from one component onto another substantially identical XMB generated by another component, the XMB 50 shown in FIG. 2 has device icons 72. The device icons 72 are established by the below-discussed device discovery logic discovering that certain components have certain UI capability. By selecting a desired icon 72 regardless of which remote control is used, only the UI (in this case, XMB) generated by the associated component is presented on the display 40, and no other icons, regardless of whether a "home" key of a remote control associated with a non-selected component is manipulated.

FIG. 3 shows example logic that may be executed by one of the processors in FIG. 1, typically by the TV processor 14. Commencing at block 74, components on the home network are discovered at installation and subsequently as new components are discovered and report their presence. Such component discovery can be in accordance with HDMI component discovery protocols.

However, in addition to HDMI discovery the logic can also move to block 76 to discover, for each network component, its UI capability by, e.g., querying each component or by comparing a component ID against a table of component IDs versus UI capability or otherwise. This discovery may be undertaken over the CEC link described above. In any case, if it is determined at decision diamond 78 that the component does not have the capability to generate a common UI, i.e., a UI that is substantially identical to a UI generated by one or more other components in the network, the logic ends, but if the component is determined to generate a common UI (such as the example XMB described above), the logic moves from decision diamond 78 to block 80.

At block 80, an icon such as a component icon 72 (FIG. 2) may be added in some implementations to the common UI generated by the TV and component. When the TV processor 14 executes the logic of FIG. 3, it not only adds an icon for the component discovered to generate the UI on the TV UI (in this case, the TV XMB), but also commands, via the CEC link, all other components in the network that generate the UI to add the icon to their respective UIs, in this case, to their respective XMBs. Thus, each XMB in this example generated by one component in the network is identical to the XMBs generated by other components in the network, with all XMBs in effect being synchronously dynamically changed as new components are added to the network that generate the common UI.

As mentioned above, a user can select a UI source by selecting at block 82 one of the icons 72 shown in the example UI of FIG. 2. In response, the UI as generated by the selected source is presented on the display 40 at block 84. To this end, if at block 82 the TV receives from the TV remote control 22 a selection of the disk player icon, the TV may communicate with the disk player via the CEC link to retrieve the disk player's UI, e.g., the disk player's XMB, to present it on the display 40. Also, the identity of the selected UI source preferably is sent to the other components in the network supporting the common UI. The identity may be sent over the CEC link.

At block 86 UI commands (for, e.g., content represented by the example XMB content icons described above) are received. These commands may be generated by the user manipulating any of the remotes 22, 28a, 30a shown in FIG. 1. Regardless of which remote was used, the component corresponding to that remote, having been informed of the currently selected UI source at block 82, forwards the commands over the CEC link to the selected component at block 88 so that the selected UI source component can execute the commands.

Block 90 simply indicates that overlays, one on top of the other, of the common UI from various components is prevented. Thus, should a user subsequently manipulate, say, the home key of the TV remote 22 while the XMB UI from the disk player 30 is being presented on the display 40, the TV processor 14 will not overlay the TV-generated XMB on top of the disk player-generated XMB since the processor 14 is programmed not to do present its own XMB when another component has been selected as the UI source at block 82.

While the particular INTEGRATED USER INTERFACE AND CONTROL IN HDMI/CEC is herein shown and described in detail, it is to be understood that the subject matter which is encompassed by the present invention is limited only by the claims.

What is claimed is:

1. System comprising:
   video display;
   processor controlling video display;
   TV tuner providing TV signals to the processor for presentation on the display;
   the processor presenting a common user interface (UI) on the TV display, the UI presenting UI source icons representing components that can source the common UI, the common UI presented on the display being generated by a component represented by a selected one of the UI source icons, wherein overlay of a UI from a non-selected component capable of generating the UI is prevented when another component is selected to source the UI even if a remote control device associated with the non-selected component is manipulated to generate a command to present the UI from the non-selected source.

2. The system of claim 1, wherein the UI also presents genre icons representing respective media genre in a horizontal row, a genre icon being selectable by means of a remote control device to cause a vertical column to be presented under the genre icon, the vertical column including icons representing content titles.

3. The system of claim 1, wherein the processor executes logic comprising:
   discovering components on the system;
   discovering, for each component, its UI capability;
   for each component determined to generate the common UI, establishing a corresponding UI source icon on the UI; and
   commanding each component determined to generate the common UI to establish the UI source icon on the common UI generated by that component.

4. The system of claim 3, wherein acts of discovering and commanding are executed at least in part using a consumer electronics control (CEC) link associated with a high definition multimedia (HDMI) link.

5. The system of claim 4, wherein a first UI source icon representing a first component is selected, and in response the identity of the first component as being the selected UI source is sent to other components in the system.

6. The system of claim 5, wherein a UI command generated by a remote control associated with a second component is sent by the second component to the first component for execution of the UI command by the first component.

7. System comprising:
   TV associated with a TV remote control and a display;
   the TV communicating with at least a first component over a HDMI link to receive multimedia data from the first component for display thereof on the TV;
   the TV communicating with the first component over a CEC link to exchange at least UI data; wherein
   the TV presents on the display a UI generated by the first component and while the UI generated by the first component is presented on the display, receives UI commands from the TV remote control, the TV forwarding the commands to the first component over the CEC link, and further wherein the UI is a common UI in that both the TV and the first component generate respective versions of it, the common UI presenting UI source icons representing components that can source the common UI, the common UI presented on the display being generated by a component represented by a selected one of the UI source icons such that a user can change which component sources the common UI by selecting one of the UI source icons.

8. The system of claim 7, wherein overlay of a UI from a non-selected component capable of generating the common UI is prevented when another component is selected to source the UI even if a remote control device associated with the non-selected component is manipulated to generate a command to present the UI from the non-selected source.

9. The system of claim 7, wherein the common UI also presents genre icons representing respective media genre in a horizontal row, a genre icon being selectable by means of a remote control device to cause a vertical column to be presented under the genre icon, the vertical column including icons representing content titles.

10. The system of claim 7, wherein the TV executes logic comprising:
    discovering components on the system;
    discovering, for each component, its UI capability;
    for each component determined to generate the common UI, establishing a corresponding UI source icon on the UI; and
    commanding each component determined to generate the common UI to establish the UI source icon on the common UI generated by that component.

11. The system of claim 10, wherein acts of discovering and commanding are executed at least in part using a CEC link.

12. The system of claim 7, wherein a first source icon representing the first component is selected, and in response the identity of the first component as being the selected UI source is sent to other components in the system.

13. Method comprising:
  discovering components in a home network along with their capability to source a common UI;
  dynamically changing the UI of each component to include UI source icons representing components in the network discovered to have the capability to source the UI, so that the user can select the component that is to source the UI;
  regardless of what remote control device in the system is used to enter UI commands to its particular component, forwarding from the component receiving the commands the commands via CEC to the component that has been selected to source the UI.

14. The method of claim 13, wherein the UI is a cross-media bar (XMB).

15. The method of claim 13, comprising:
  for each component determined to generate the UI, establishing a corresponding UI source icon on the UI; and
  commanding each component determined to generate the UI to establish the UI source icon on the UI generated by that component.

16. The method of claim 15, wherein a first UI source icon representing a first component is selected, and in response the method includes sending the identity of the first component as being the selected UI source to other components in the system.

17. The method of claim 13, wherein overlays, one on top of the other, of the UI from various components is prevented.

* * * * *